(12) United States Patent
Vasudevan

(10) Patent No.: US 8,965,826 B2
(45) Date of Patent: Feb. 24, 2015

(54) DYNAMIC BACKJUMPING IN CONSTRAINT SATISFACTION PROBLEM SOLVING

(75) Inventor: Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 12/781,497

(22) Filed: May 17, 2010

(65) Prior Publication Data

US 2011/0282820 A1    Nov. 17, 2011

(51) Int. Cl.
*G06N 5/00* (2006.01)

(52) U.S. Cl.
CPC .................................. *G06N 5/00* (2013.01)
USPC ............................................. 706/47; 706/46

(58) Field of Classification Search
None
See application file for complete search history.

(56) References Cited

U.S. PATENT DOCUMENTS

| | | | |
|---|---|---|---|
| 4,660,130 A | 4/1987 | Bartley et al. | |
| 5,228,115 A | 7/1993 | Natarajan | |
| 5,249,261 A | 9/1993 | Natarajan | |
| 5,666,469 A | 9/1997 | Lee | |
| 6,038,551 A | 3/2000 | Barlow et al. | |
| 6,199,387 B1 | 3/2001 | Sauterleute | |
| 6,772,179 B2 | 8/2004 | Chen et al. | |
| 6,877,089 B2 | 4/2005 | Sinharoy | |
| 2003/0108039 A1 | 6/2003 | Shell et al. | |
| 2004/0220965 A1 | 11/2004 | Harville et al. | |
| 2005/0065902 A1 | 3/2005 | DeGivry et al. | |
| 2005/0171747 A1 | 8/2005 | Franco et al. | |
| 2006/0200449 A1* | 9/2006 | Pauws ................ | 707/3 |
| 2007/0094174 A1 | 4/2007 | Hamadi et al. | |
| 2007/0250476 A1 | 10/2007 | Krasnik | |
| 2008/0010633 A1 | 1/2008 | Streeter et al. | |
| 2008/0028095 A1 | 1/2008 | Lang et al. | |
| 2008/0065622 A1 | 3/2008 | Goto et al. | |
| 2008/0104535 A1 | 5/2008 | DeLine et al. | |

OTHER PUBLICATIONS

Gent, Nightingale, Rowley, Stergiou, "Solving Quantified Constraint Satisfaction Problems", Artificial Intelligence, vol. 172, 2008, pp. 738-771.*
Nieuwenhuis, Oliveras, Tinelli, Solving SAT and SAT Modulo Theories: From an Abstract Davis-Putnam-Logemann-Loveland Procedure to DPLL(T), Journal of the ACM (JACM), ACM, New York, vol. 53 Issue 6, Nov. 2006. pp. 937-977.*
Kurien, Nayak, and Smith, "Fragment-based Conformant Planning", American Association for Artificial Intelligence (www.aaai.org), 2002, pp. 1-10.*

(Continued)

*Primary Examiner* — Kakali Chaki
*Assistant Examiner* — Walter Hanchak
(74) *Attorney, Agent, or Firm* — Kunzler Law Group; Damion Josephs

(57) ABSTRACT

A method of performing constraint satisfaction problem (CSP) solving. The method comprises evaluating the nodes of a CSP tree for a TRUE or FALSE state according to a script, wherein the tree models a CSP problem and the script associates rules and corresponding actions with each tree node. During a step of evaluating a specific node, there is dynamically computed a backjump pointer according to a specific rule associated with the specific node, wherein the value of the computed backjump pointer identifies an ancestor node of the tree. Upon a failure to evaluate the node to a TRUE state, the evaluation is restarted at the ancestor node identified by the backjump pointer.

15 Claims, 6 Drawing Sheets

(56) References Cited

OTHER PUBLICATIONS

Marques-Silva, J.P. and Sakallah, K.A., "GRASP: a search algorithm for propositional satisfiability", Computers, IEEE Transactions on (vol. 48, Issue: 5 ), May 1999, pp. 506-521.*
John Franco, Michal Kouril, John Schlipf, Jeffrey Ward, Sean Weaver, Michael Dransfield, W. Mark Vanfleet, "SBSAT: a State-Based, BDD-Based Satisfiability Solver", from Theory and Applications of Satisfiability Testing, Enrico Giunchiglia Armando Tacchella Eds., 2004, pp. 398-410.*
Roman Bartak, Constraint Propagation and Backtracking-Based Search, No other known information.
Carla Gomes, Randomized Backtrack Search, No other known information.
Hantao Zhang, A Random Jump Strategy for Combinatorial Search, Dec. 14, 2001, No other known information.
J.H. Hester, et al., Self-Organizing Search Lists Using Probabilistic Back-Pointer, http://www.ics.uci.edu/~dan/pubs/backptr.pdf, Magazine: Communications of the ACM, vol. 30 Issue 12, pp. 1074-1079, Dec. 1987.
Bhalla, et al., "Heuristic Backtracking Algorithms for SAT": Proc. of the 4th Intnl. Workshop on Microprocessor test and Verification Common Challenges and Solutions, http://citeseerx.ist.psu.edu/viewdoc/summary? doi=10.1.1.333.386, 2003.
Vipin Kumar, "Algorithms for Constraint-Satisfaction Problems: A Survey"; http://citeseerx.ist.psu.edu/viewdoc/summary?doi=10.1.1.39.8020, AI Magazine, Spring 1992.
Rina Dechter and Daniel Frost, "Backtracking algorithms for constraint satisfaction problems", http://citeseerx.ist.psu.edu/viewdoc/summary?doi=10.1.1.43.5904, 1998.
Xinguang Chen and Peter Van Beek, "Conflict-Directed Backjumping Revisited": Journal of Artificial Intelligence Research 14, http://www.jair.org/media/788/live-788-1933-jair.pdf, 2001.
Matthew L. Ginsberg, "Dynamic Backtracking": Journal of Artificial Intelligence Research, 1 , http://arxiv.org/pdf/cs/9308101.pdf, 1993.
Wikibooks, Algorithms/Backtracking, http://en.wikibooks.org/wiki/Algorithms/Backtracking, Oct. 15, 2009.

* cited by examiner

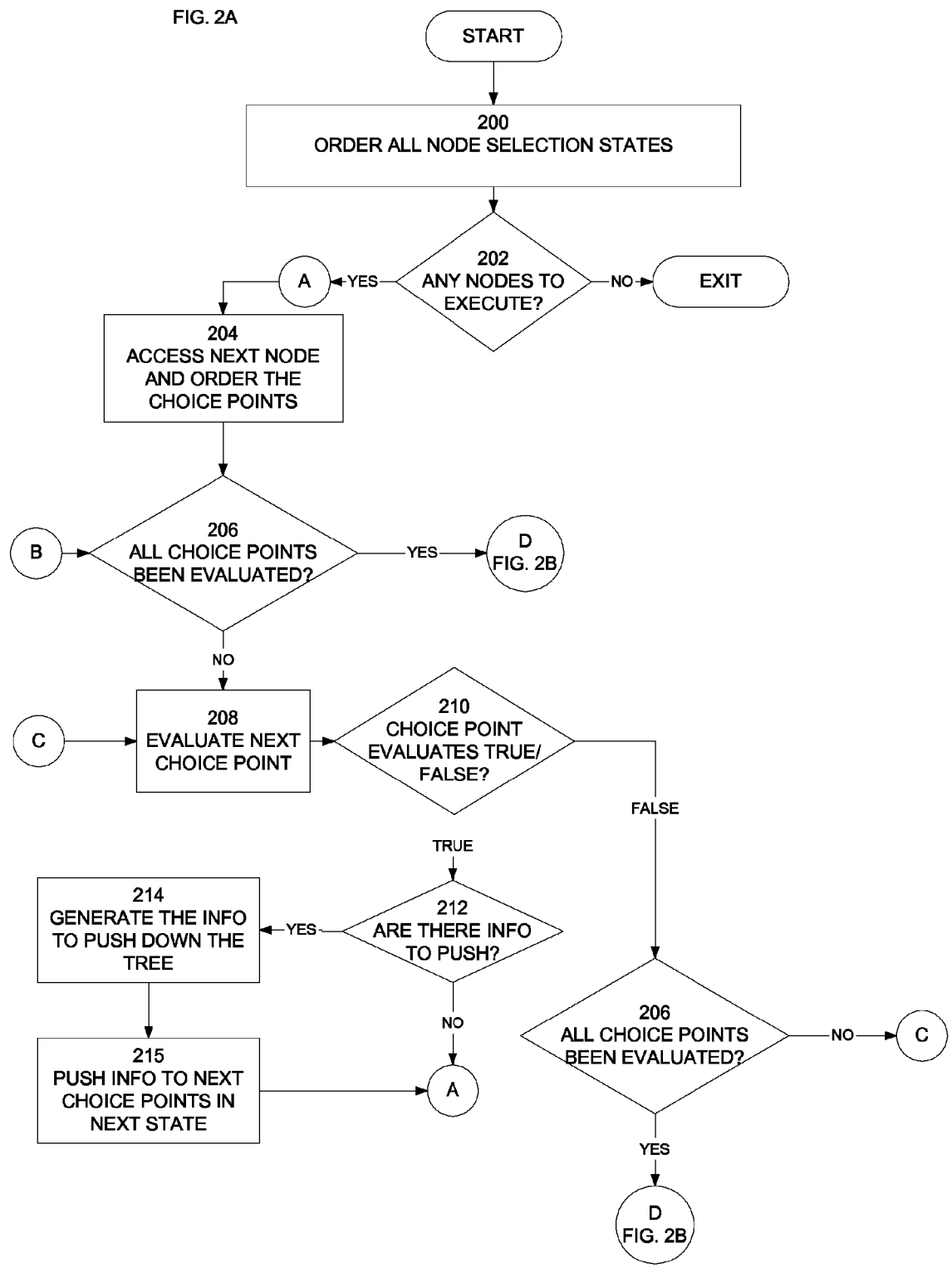

FIG. 5

S0  Server Selected
        Rule: Server needs Processor

S1.1 Processor Selected

Rule: IF <processor_selected> THEN
            SET <cur_state.ifsn = "proc_sel_state":cur_state>
        Rule: server needs disk drive

S2.1: Disk drive selected
        Rule: IF <disk selected>, THEN
            SET <cur_state.ifsn = disk_sel_state:cur_state> AND
            SET <cur_state.ifsn = cur_state.ifsn + cur_state.iifn.proc_sel_state>
            SET <cur_state.ifsn = cur_state.ifsn + "disk_type":cur_disk_type>
        "

S3.1. Rack selected
        Rule:  IF <rack selected> THEN
            SET <cur_state.bjp = cur_state.iifn.disk_sel_state> AND
            SET <cur_state.ifsn = cur_state.iifn.disk_sel_state> AND
            SET <cur_state.ifsn = cur_state.ifsn + cur_state.iifn.proc_sel_state> AND
            SET <cur_state.ifsn = cur_state.ifsn + "disk_type":cur_disk_type>
        Rule: Disk needs power

S3.2. Power Supply (PS) selected
        Rule:  IF <power selected> THEN
            SET <cur_state.bjp = cur_state.iifn.disk_sel_state> AND
            SET <cur_state.ifsn = cur_state.iifn.disk_sel_state> AND
            SET <cur_state.ifsn = cur_state.ifsn + cur_state.iifn.proc_sel_state> AND
            SET <cur_state.ifsn = cur_state.ifsn + "disk_type":cur_disk_type>
        Rule:  Disk needs Controller

S3.3. Controller Selected
        Rule:  IF <Controller selected> THEN
            SET <cur_state.bjp = cur_state.iifn.disk_sel_state> AND
            SET <cur_state.ifsn = cur_state.iifn.disk_sel_state> AND
            SET <cur_state. ifsn = cur_state.ifsn + cur_state.iifn.proc_sel_state>

Rule:   IF <cur_state.iifn.disk type> = 'SCSI' THEN
            SET <cur_state.bjp = cur_state.iifn.proc_sel_state>
        Rule: Controller needs slot

S4. Slot selected
        Rule:   IF <slot selected> THEN
            SET<cur_state.bjp = cur_state.iifn.disk_sel_state>
            IF <slot selected> THEN
                SET <cur_state.ifsn = cur_state.iifn.disk_sel_state > AND
                SET <cur_state.ifsn = cur_state.ifsn + iifn.proc_sel_state>
        Rule: Controller needs SW

S5. SW selected
        Rule:   IF <SW selected> THEN
            SET <cur_state.bjp = cur_state.iifn.proc_sel_state>

DYNAMIC BACKJUMPING IN CONSTRAINT SATISFACTION PROBLEM SOLVING

TECHNICAL FIELD

The invention relates to the field of constraint satisfaction problem (CSP) solving in general, and specifically to reducing the time and complexity of CSP problem solving by dynamically determining jump back points in nodal trees that model a CSP problem.

BACKGROUND OF THE INVENTION

CSP problem solving is well known to skilled art workers and there are many known ways of reducing the time required to solve many complex problems. In general, CSP problem solving can be succinctly stated as follows:

Given a set of variables $\{X_1, X_2, \ldots, X_n\}$,
where each variable $X_i$ has a domain $D_i$ of possible values,
and there are a set of constraints $\{C_1, C_2, \ldots, C_p\}$, where each constraint $C_i$ involves a subset of the variables and specifies allowable combinations of the values of these variables,
then find an allowable value for every variable such that all constraints are satisfied.

FIG. 1 shows an example nodal tree that models a fictional CSP problem. Node trees are typically used to model a CSP problem. Each node S is corresponds to a variable $X_i$ and is assigned an ordered sequence of possible values from domain Di. An order of node evaluation is also assigned. Typically, a node evaluation sequence might be to evaluate all nodes in each tree leg left to right until all nodes evaluate as FALSE or a leaf node evaluates as TRUE. When a leaf node evaluates as TRUE, a solution is found to the problem. Thus, in FIG. 1, the variable assigned to node S0 is evaluated against each ordered value in domain $D_{21\ and}$ each constraint $C_i$ until one value evaluates as TRUE over all constraints or the domain is exhausted. Assuming that a TRUE value is found for S0, the typical algorithm then moves down a leg eventually to test the leaf nodes such as S3.1 and S3.1. Assuming that all evaluations of any node is FALSE, then the typical algorithm backtracks to evaluate a new leg, which might be the leg starting with node S1.2 in this example. In real life CSP problems, the number of nodes, variables and constraints can be very large and, despite known ways of heuristically removing some nodes and constraints, a solution, if it exists, can consume a lot of time and resources.

SUMMARY OF THE INVENTION

A first embodiment is a computer-readable storage medium containing program code for controlling a computer to perform constraint satisfaction problem (CSP) solving. The program code contained within the storage medium comprises code for evaluating the nodes of a CSP tree for a TRUE or FALSE state according to a script, wherein the tree models a CSP problem and the script associates rules and corresponding actions with each tree node. The storage medium further contains code executed during a step of evaluating a specific node for computing a backjump pointer according to a specific rule associated with the specific node, wherein the value of the computed backjump pointer identifies an ancestor node of the tree. The storage medium further contains code to be executed upon a failure to evaluate the node to a TRUE state for restarting evaluation at the ancestor node identified by the backjump pointer.

A second embodiment is a computer system for performing constraint satisfaction problem (CSP) solving. The system comprises an engine for evaluating the nodes of a CSP tree for a TRUE or FALSE state according to a script, wherein the tree models a CSP problem and the script associates rules and corresponding actions with each tree node. During an evaluation of a specific node, the engine computes a backjump pointer according to a specific rule associated with the specific node, wherein the value of the computed backjump pointer identifies an ancestor node of the tree. Upon a failure to evaluate the node to a TRUE state, the engine restarts evaluation at the ancestor node identified by the backjump pointer.

All embodiments further include the capability at a node to propagate information to descendent nodes of the node.

The above as well as additional objects, features, and advantages of the present invention will become apparent in the following detailed written description.

BRIEF DESCRIPTION OF THE DRAWING

The novel features characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 2A and 2B together form an flowchart used to describe an illustrative embodiment of dynamic backtracking to reduce time and resources in solving CSP problems;

FIG. 5 discloses an example script that is interpreted and executed by the engine of FIGS. 2A and 2B.

DETAILED DESCRIPTION

Figure 1:
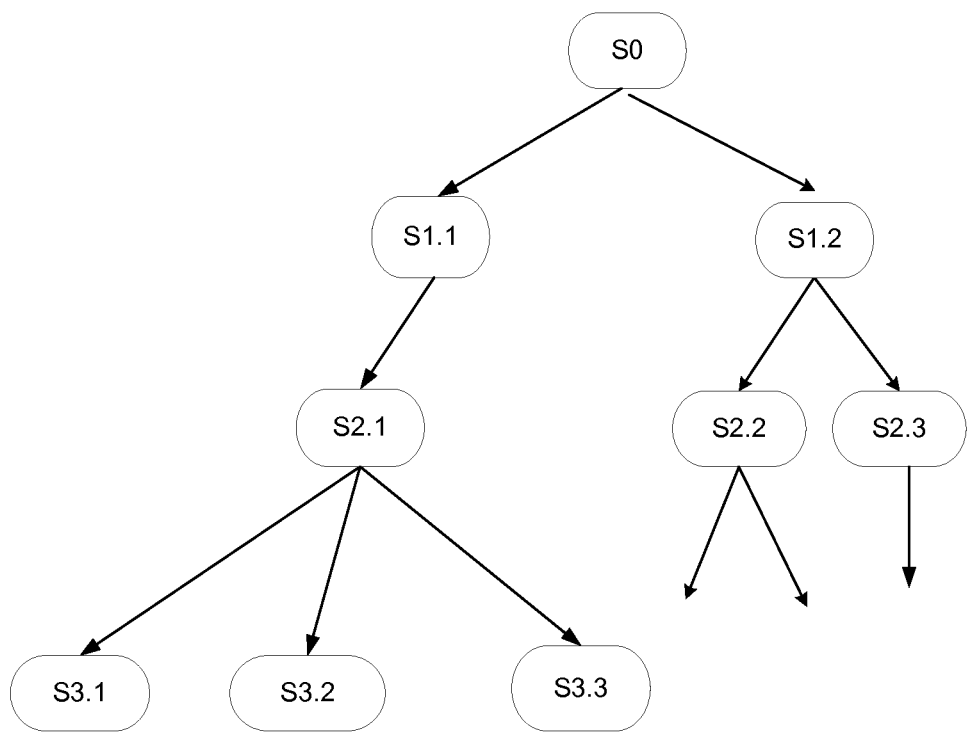
FIG. 1 is a hierarchical node tree used to explain CSP problem solving in general as an aid in understanding the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

Figure 2B:
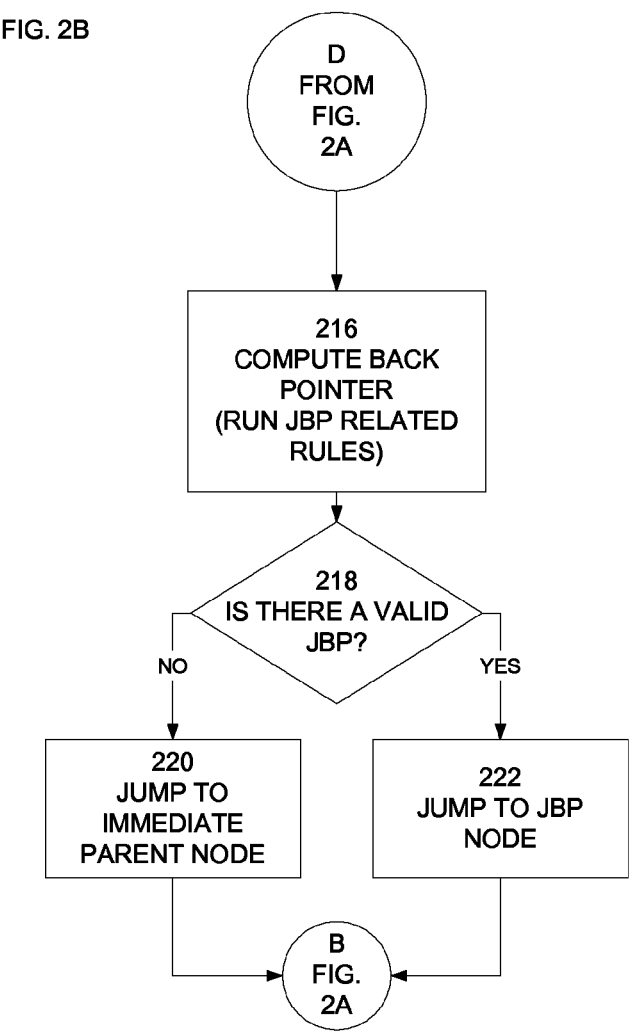

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. With reference now to the figures and in particular with reference to FIG. 1, there is depicted a FIGS. 2A and 2B show an illustrative flowchart of a CSP engine that could be used to implement the invention. The steps of the flowchart assume that a script modeling a CSP problem node tree has been designed and the flowchart executes the script to evaluate the nodes of the tree until a solution to the problem is found or the tree is exhausted. Step 200 of FIG. 2 orders the selection states of the tree according to instructions. This could correspond to evaluating the nodes in each leg from left to tight and from top to bottom until a solution is found. Step 202 then determines if there are nodes to evaluate at this point in the problem solution. Assuming that there are nodes, execution proceeds to step 204 where all choice points are ordered for evaluation. A series of choice points at a node correspond to all possible values of a variable at the node, as explained in the Background of the Invention. Step 206 determines if all choice points at a present node have been evaluated. The answer at this first iteration would normally be NO, so step 208 then selects the first (or next) choice point and step 210 evaluates the result according to known ways of solving CSP problems. If the choice point evaluates TRUE, the algorithm moves on to the next ordered node in the CSP process. But first, step 212 determines if there is information to push down to descendent nodes in the tree. Such information includes the present state of a backjump point (BJP), a variable IFSN that sometimes contain one or more value pairs of the form <attribute:value>, . . . , <attribute:value> that are to be pushed down the tree and a variable IIFN that also might contain attribute value pairs that are used to calculate a backjump pointer. The value(s) in IIFN are set by the engine of FIGS. 2A and 2B based on what is set in the IFSN information according to the rules embedded in the model script. If the rules at the present node call for resetting or appending new value pairs to IFSN or IIFN, step 212 passes execution to step 214 where the variables are updated and then passed down the tree at step 215. Otherwise, step 212 returns to step 204 where the next ordered node is accessed. It should be mentioned here that if all nodes have been exhausted at step 202, then no solution exists given the choice points and constraints in the model of the CSP.

Returning to step 210, if the present node and selected choice point at that node evaluates to FALSE, step 206 determines if all choice points at this node have been evaluated. If there are more choice points, control is transferred to step 208 where the next choice point at the present is selected for evaluation. If all choice points have been evaluated, by default a backjump to the immediate parent node is made at step 207. However, if at step 206 all choice points have now been evaluated and all have evaluated to FALSE, there is no solution to the CSP in following the present branch of the tree. In this event, control is transferred to step 216 where a backjump pointer bjp is dynamically calculated using backjump rules in the script and the values of the one or more value pairs in variable IIFN. Examples of this dynamic calculation are given below with respect to FIG. 3. It is possible that step 216 does not calculate a backjump pointer because there are no backjump rules in the script for this node. In such a case, it is possible that a backjump point is present in variable BJP from a previous node. Step 218 determines if a valid backjump pointer now exists in BJP. If there is no valid pointer present, the default operation in this embodiment is to backjump to the parent node and proceed from there by selecting the nest choice point at that parent node for evaluation. If BJP at the present node is valid at step 218, step 222 then jumps back to the node identified in BJP and then begins node evaluation at the backjump node at step 206.

Figure 3:
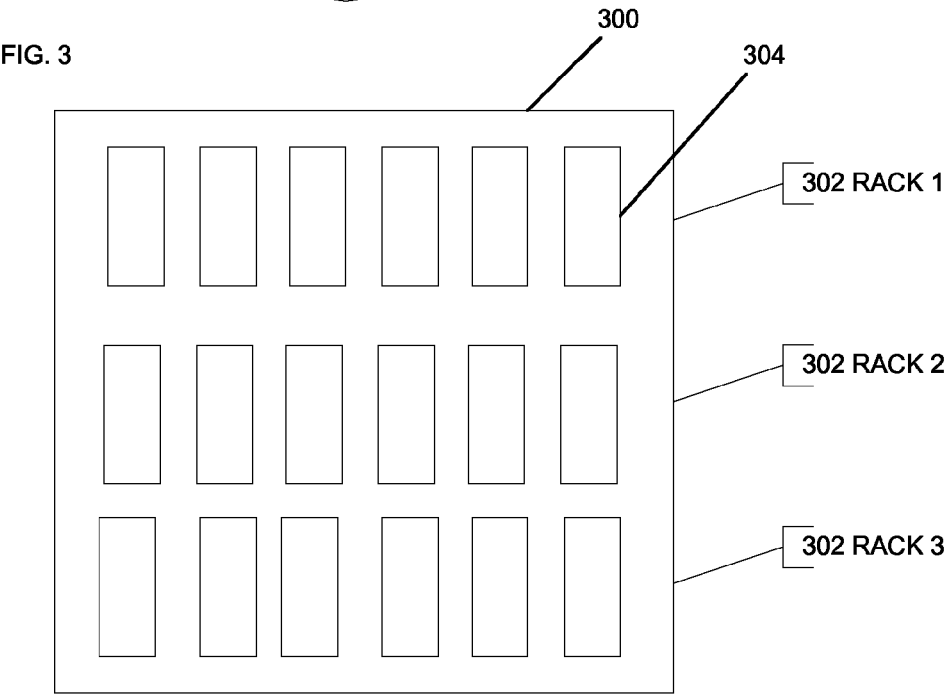
FIG. 3 is an illustration of an electronics cabinet that is used to describe a CSP example problem.

The invention will now be described using a simplified CSP problem. FIG. 3 illustrates electronics cabinet 300 having a number of racks 302 with each rack containing a number of slots 304 for accepting cards containing electronic circuitry. The CSP problem is to configure the cabinet with a controller, disk drive, power supply, etc to form a computer.

Figure 4:
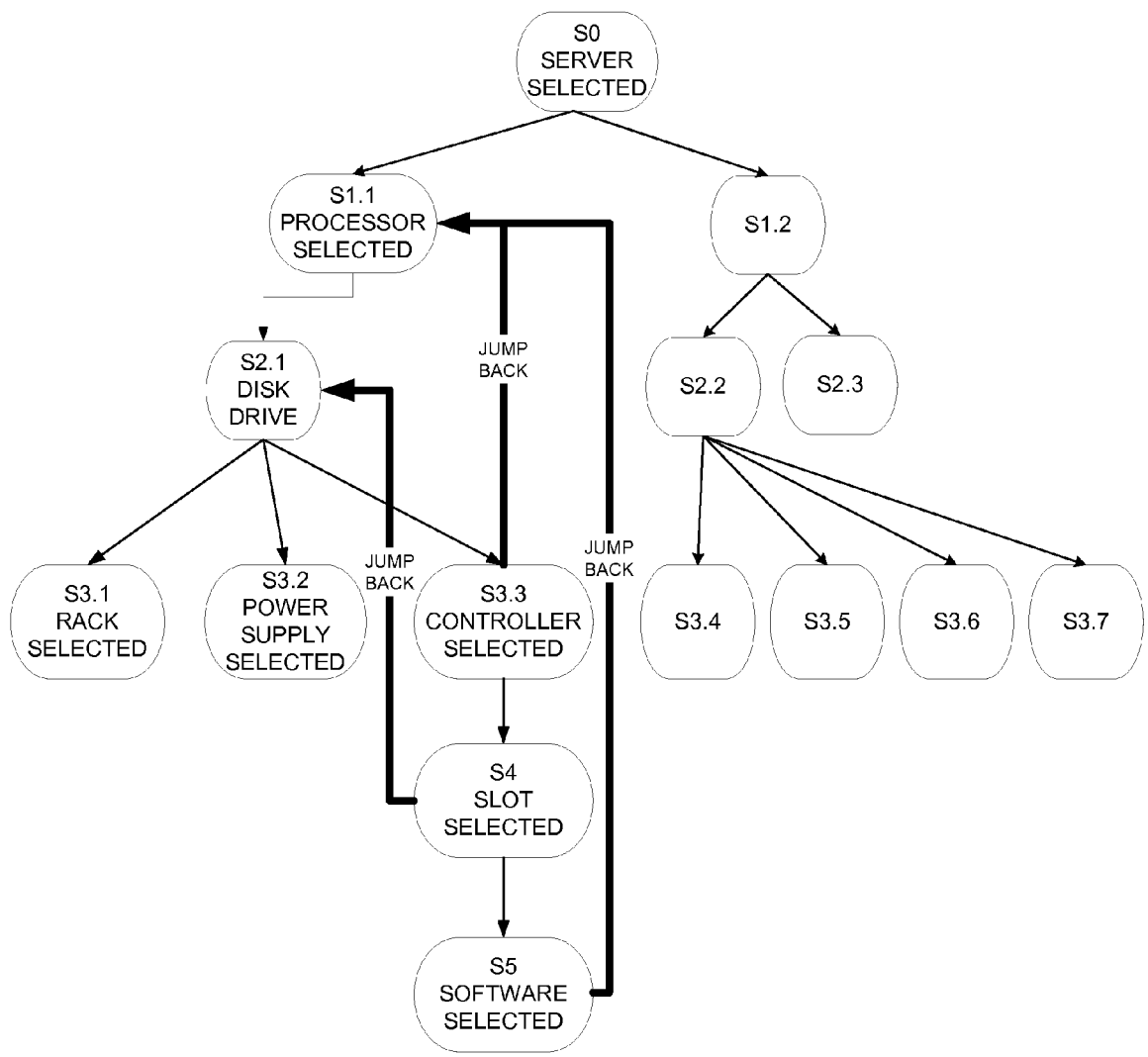
FIG. 4 is a partial node tree that characterizes the example CSP problem and further aids in understanding the invention.

FIG. 4 shows one example of a tree that models this CSP problem. Each node of the tree is assigned one or more choice points that are not shown for simplicity. As progress is made through evaluation of the tree, the primary purpose is to demonstrate the generation of dynamic backjump points to return to higher level node in the event of an evaluation failure at a node. For example, FIG. 5 is one illustrative script that is executed by the CSP engine of FIG. 2 to attempt to automatically find a solution to the CSP problem. FIGS. 4 and 5 will demonstrate dynamic backjumps on failure from nodes S3.3 to S1.1, from S4 to S2.1 and S5 to S1.1. The execution of the entire model of FIGS. 4 and 5 is not described in detail. Rather, a sufficient description is described to illustrate the calculation of dynamic backjump points as the solution progresses. Also, the actual evaluations of choice points against constraints are not described. Skilled art workers in the relevant fields are well aware of methods of performing such evaluations and are not in need of such descriptions to understand the novel aspects of dynamically determining backjump points as disclosed herein. First, the following examples of notation used in the script should be enough to follow the logic of the script.

Notation:

S1.1.bjp means the value of the backjump pointer at node S1.1.

"cur_state" means the current node of the engine. The engine is always aware of its current state.

S1.1.iifn."disk_sel_state" means the value of a key "disk_sel_state" contained within the possible multiple values of the variable IIFN of node S1.1, for example.

A value+another value means the values are added to a list, such as a concatenation in a string, for example.

The rule components "IF <processor_selected>" or "IF <disk_selected>", as examples, means a candidate choice point has been chosen by the user or as a result of a rule execution.

With reference now to the script of FIG. 4, when the engine executes S0, the rule "Server needs Processor" causes the engine to select the first processor that is defined by the list of choice points assigned to S0. The engine then moves to node S1.1.

Node S1.1. In S1.1, the rule
Rule: IF <processor_selected> THEN
    SET <cur_state.ifsn="proc_sel_state":cur_state>
causes the engine to set IFSN to the value of "proc_sel_state: S1.1, since the current state is S1.1. This also causes the engine to pass IFSN down to the descendents of S1.1. Next, the rule
Rule: server needs disk drive
causes the engine to select a disk from the list of possible disk drives assigned at node S1.1. The engine then moves to node S2.1

Node S2.1. At S2.1, the first SET statement sets IFSN to the value "disk_sel_state:S2.1".
The second SET statement causes IFSN to have values "proc_sel_state:S1.1" and "disk_sel_state:S2.1". These values are pushed to descendents of S2.2 by the engine and are available to those descendent nodes as values of IFSN of node S2.1.
In the third SET statement "cur_disk_type" is an attribute of the disk drive that has been selected. Some potential values, for example, could be "SCSI", "SATA", "IDE", "SAS", etc. IFSN now have values: "disk_sel_state:S2.1", "proc_sel_state:S1.1", "cur_disk_type": <type of disk selected>.
The last statement of S2.1
Rule: IF <Disk is rack_mountable> THEN <Disk needs rack>
causes the engine to examine an attribute of the selected disk drive to determine if it is rack-mountable. In this event, the rule causes the engine to select a rack of the cabinet for mounting the selected disk drive.

Node S3.1. The first rule of S3.1 determines if a rack has been selected. If not, the SET statements following the rule are ignored and execution moves on to the second rule "Disk needs power". In this case, the engine selects a power supply from the choice points assigned to node 3.1. The engine next moves on to node S3.2.
It's worth noting at this point of evaluation that if a constraint (not shown) fails at S3.1, the engine by default will back jump to the immediate parent node S2.1 (see step 220 of FIG. 2B), because a BJP has not yet been set to any value. In this example, let's assume that the selected disk drive is rack-mountable. In this case, the first SET statement of S3.1 sets bjp with a value=S2.1 since this was pushed down by the engine from the previous state S2.1 and is now available as a value of iifn of current state (S3.1).
The next two SET statements set the current state of ifsn to "proc_sel_state:S1.1", and "disk_sel_state:S2.1" and cause the engine to push the values of proc_sel_state and disk_sel_state to the node descendents of S3.1.

Node S3.2. The value of iifn of State S3.2 is the value that was pushed down from its parent.
Currently the values are "disk_sel_state:S2.1" and "proc_sel_state:S1.1" which are set on the ifsn attribute of S3.2. Assuming that a power supply has been selected, The first SET statement of node S3.2 set the bjp for S3.2 equal to "disk_sel_state:S2.1"
The second and third SET statements causes step 214 of FIG. 2A to push the info of proc_sel_state and disk_sel_state to the lower nodes. The iifn attribute that is pushed down now has the values "proc_sel_state:S1.1", and "disk_sel_state:S2.1". The last SET statement of S3.2 sets ifsn to the values "disk_sel_state:S2.1", "proc_sel_state:S1.1", and "cur_disk_type":<type of disk selected>.
The final rule of S3.2 causes the engine to select a controller and then move on to S3.3.

Node S3.3. Assuming that a controller has been selected, the first rule sets the bjp to the value of curstate.iifn.disk_sel_state, which is "S2.1". This means that if the controller selection fails for any reason, the engine should jump back to S2.1 to select a different controller.
The second rule of S3.3 instructs the engine that if the disk drive type is SCSI, then don't try another disk on failure. Rather, replace the present value of jbp with S1.1 and select a different processor by back jumping to S1.1.
The final rule of S3.3 instructs the engine to select a slot in the cabinet for the present controller.

Node S4. The first rule changes the bjp such that if the slot selection for the controller fails, a new disk drive is needed. Jump to S2.1.
The two SET statements cause the disk selection node "disk_sel_state:S2.1" and proc_sel_node "proc_sel_state:S1.1" to be pushed down to the descendent nodes by setting the value of "ifsn".
The final rule of S4 causes the engine to select a software (SW) application for execution by the controller. It is possible that the application might be incompatible with other components in the present state of the solution.

Node S5. The rule of S5 states that if the SW selection fails, a different type of processor might be needed. In case of a SW selection failure. jump to proc_sel_state (S1.1). The "proc_sel_state" is read from the iifn of this state (S5). iifn has the values set by the engine from the ifsn of the parent state (S4).

Figure 6:
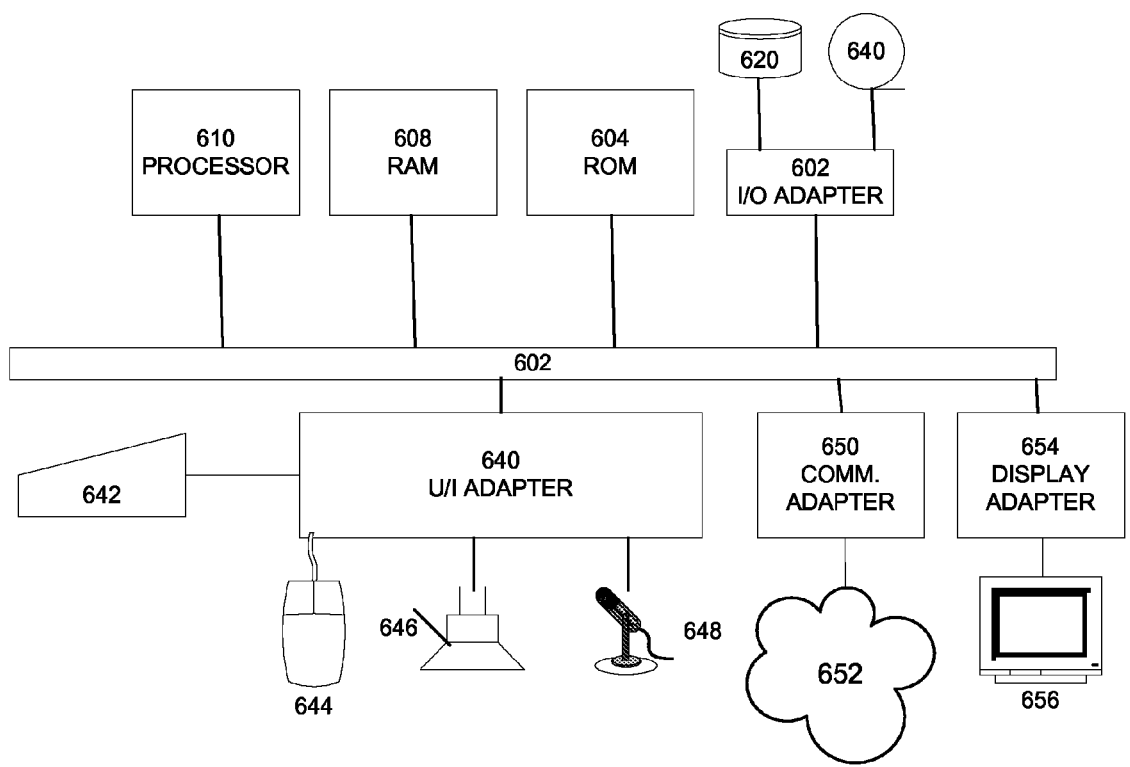
FIG. 6 is an illustrative example of a general purpose, or personal or special purpose computer that might be used to solve a CSP problem according to the invention.

FIG. 6 illustrates a simplified example of an information handling system that might be used to practice the present invention. The invention may be implemented on a variety of hardware platforms, including embedded systems, personal computers, workstations, servers, and mainframes. The computer system of FIG. 6 has at least one processor 610. Processor 610 is interconnected via system bus 602 to random access memory (RAM) 608, read only memory (ROM) 604, and input/output (I/O) adapter 602 for connecting peripheral devices such as disk unit 620 and tape drive 640 to bus 602. The system has user interface adapter 640 for connecting keyboard 642, mouse 644, or other user interface devices such as audio output device 646 and audio input device 648 to bus 602. The system might have a communication adapter 650 for connecting the information handling system to a data processing network 652, and display adapter 654 for connecting bus 602 to display device 656. Communication adapter 650 might link the system depicted in FIG. 6 with hundreds or even thousands of similar systems, or other devices, such as remote printers, remote servers, or remote storage units. The system depicted in FIG. 6 may be linked to both local area networks (sometimes referred to as intranets) and wide area networks, such as the Internet.

It will be appreciated that the computer system illustrated in FIG. 6 is merely illustrative, and is not meant to be limiting in terms of the type of system which may provide a suitable operating environment for practicing the present invention. While the computer system described in FIG. 6 is capable of executing the processes described herein, this computer system is simply one example of a computer system. Many systems are capable of performing the processes of the invention.

It should be clear that there are many ways that skilled artisans might use to accomplish the essential steps to police an overall network solution, other that the specific steps and data structures described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

I claim:

1. A computer-readable non-transitory storage medium comprising program code for controlling a computer to perform constraint satisfaction problem (CSP) solving, the program code comprising
    code for evaluating variables at nodes of a CSP tree for a TRUE or FALSE state according to a script user-defined for each specific CSP, wherein the tree models a CSP problem and the script associates rules and corresponding actions with each tree node,
    code executed during a step of evaluating a variable at a specific node, for computing a backjump pointer according to a specific user-defined rule associated with the specific node and CSP, wherein the value of the computed backjump pointer identifies a node of the tree, wherein the specific node receives information from a parent node and computes the backjump pointer based on the received information, the received information including one or more attribute-value pairs corresponding to attributes of a variable evaluated at an ancestor node,
    code executed upon evaluating the specific node to a TRUE state, for pushing state information created by other user-defined rules in the specific node and attribute-value pairs for the variable evaluated at the specific node to a child node to be used by the child node to compute a backjump pointer from the child node, and
    code executed upon a failure to evaluate the node to a TRUE state, for restarting evaluation at the node identified by the backjump pointer.

2. The storage medium of claim 1 further comprising code for passing the value of the computed backjump pointer from the specific node under evaluation to a child node of the specific node under evaluation for use in subsequently determining a backjump pointer from the child node.

3. The storage medium of claim 2 further comprising code to be executed at a child node of the specific node to calculate a new backjump pointer according to a rule associated with the child node.

4. The storage medium of claim 1 further comprising code to be executed at the specific node under evaluation for generating second information according to a rule and passing the second information to a child node for computing a backjump pointer at the child node.

5. The storage medium of claim 1 further comprising code to be executed at the specific node under evaluation for restarting evaluation at a parent node of the specific node under evaluation if the backjump pointer has no valid value.

6. A computer system for performing constraint satisfaction problem (CSP) solving, comprising
an engine for evaluating variables at nodes of a CSP tree for a TRUE or FALSE state according to a script user-defined for each specific CSP, wherein the tree models a CSP problem and the script associates rules and corresponding actions with each tree node,
during an evaluation of a variable at a specific node, the engine computes a backjump pointer according to a specific user-defined rule associated with the specific node and CSP, wherein the value of the computed backjump pointer identifies a node of the tree, wherein the specific node receives information from a parent node and computes the backjump pointer based on the received information, the received information including one or more attribute-value pairs corresponding to attributes of a variable evaluated at an ancestor node,
upon evaluating the specific node to a TRUE state, pushing state information created by other user-defined rules in the specific node and attribute-value pairs for the variable evaluated at the specific node to a child node to be used by the child node to compute a backjump pointer from the child node, and
upon a failure to evaluate the specific node to a TRUE state, the engine restarts evaluation at the node identified by the backjump pointer.

7. The computer system of claim 6 wherein the engine further comprises program code for passing the value of the computed backjump pointer from the specific node under evaluation to a child node of the tree.

8. The computer system of claim 7 wherein the engine further comprises program code executed at the child node wherein the child node can calculate a new backjump pointer according to a rule associated with the child node.

9. The computer system of claim 6, wherein the engine further comprises program code executed at the specific node under evaluation to generate second information according to a rule and to pass the second information to a child node for computing a backjump pointer at the child node.

10. The computer system of claim 6 wherein the engine further comprises program code executed at the specific node under evaluation to restart evaluation at a parent node of the specific node under evaluation if the backjump pointer has no valid value.

11. A method of performing constraint satisfaction problem (CSP) solving, comprising
evaluating nodes of a CSP tree for a TRUE or FALSE state according to a script, wherein the tree models a CSP problem and the script associates rules and corresponding actions with each tree node,
during a step of evaluating a specific node, computing a backjump pointer according to a specific user-defined rule associated with the specific node and CSP, wherein the value of the computed backjump pointer identifies a node of the tree, wherein the specific node receives information from a parent node and computes the backjump pointer based on the received information, the received information including one or more attribute-value pairs corresponding to attributes of a variable evaluated at an ancestor node,
upon evaluating the specific node to a TRUE state, pushing state information created by user-defined rules in the specific node and attribute-value pairs for the variable evaluated at the specific node to a child node to be used by the child node to compute a backjump pointer from the child node, and
upon a failure to evaluate the specific node to a TRUE state, restarting evaluation at the node identified by the backjump pointer.

12. The method of claim 11 further comprising passing the value of the computed backjump pointer from the specific node under evaluation to a child node of the tree.

13. The method of claim 12 wherein a descendent node can calculate a new backjump pointer according to a rule associated with the child node.

14. The method of claim 11 further comprising at the specific node under evaluation generating second information according to a rule and passing the second information to a descendent node.

15. The method of claim 11 further comprising at the specific node under evaluation restarting evaluation at a parent node of the specific node under evaluation if the backjump pointer has no valid value.

* * * * *